US008214524B2

(12) United States Patent
Kim et al.

(10) Patent No.: US 8,214,524 B2
(45) Date of Patent: Jul. 3, 2012

(54) SYSTEM AND METHOD FOR SELECTING AN OPTIMAL AUTHORITATIVE NAME SERVER

(75) Inventors: JooYong Kim, Des Plaines, IL (US); YoungBae Oh, Chicago, IL (US); DongHyun Kim, Des Plaines, IL (US)

(73) Assignee: Hostway Corporation, Chicago, IL (US)

( * ) Notice: Subject to any disclaimer, the term of this patent is extended or adjusted under 35 U.S.C. 154(b) by 657 days.

(21) Appl. No.: 12/121,518

(22) Filed: May 15, 2008

(65) Prior Publication Data

US 2009/0164661 A1 Jun. 25, 2009

Related U.S. Application Data

(60) Provisional application No. 61/016,293, filed on Dec. 21, 2007.

(51) Int. Cl.
*G06F 15/173* (2006.01)
*G06F 17/30* (2006.01)
(52) U.S. Cl. ....................................... 709/238; 709/245
(58) Field of Classification Search .................. 709/238, 709/245
See application file for complete search history.

(56) References Cited

U.S. PATENT DOCUMENTS

| 6,108,703 | A | 8/2000 | Leighton et al. |
|---|---|---|---|
| 6,415,323 | B1 | 7/2002 | McCanne et al. |
| 6,553,413 | B1 | 4/2003 | Leighton et al. |
| 6,578,066 | B1 | 6/2003 | Logan et al. |
| 6,754,699 | B2 | 6/2004 | Swildens et al. |
| 6,785,704 | B1 | 8/2004 | McCanne |
| 6,845,400 | B2 | 1/2005 | Macpherson et al. |
| 6,954,790 | B2 | 10/2005 | Forslöw |
| 6,976,090 | B2 * | 12/2005 | Ben-Shaul et al. ........... 709/246 |
| 7,020,698 | B2 | 3/2006 | Andrews et al. |
| 7,254,626 | B1 | 8/2007 | Kommula et al. |
| 7,756,065 | B2 * | 7/2010 | Chung et al. .................. 370/255 |

(Continued)

FOREIGN PATENT DOCUMENTS

EP 1207668 A2 5/2002

(Continued)

OTHER PUBLICATIONS

"Use of Anycast Clusters for Inter-Domain Multicast Routing", available at http://tools.ietf.org.draft-farinacci-anycast-clusters-01.txt (accessed Dec. 17, 2007)(6 pages).

(Continued)

*Primary Examiner* — Wing Chan
*Assistant Examiner* — Kostas Katsikis
(74) *Attorney, Agent, or Firm* — Brinks Hofer Gilson & Lione

(57) ABSTRACT

A system and method for selecting an optimal authoritative name server includes global authoritative name servers and regional authoritative name servers. The local name server receives a request for target objects from a client. The local name server inquires one of the global authoritative name servers about an IP address of a requested domain. The selected global authoritative name server initially responds to the local name server. For subsequent requests, the selected global authoritative name server guides the local name server to inquire one of the regional authoritative name servers by providing a new authoritative name server list including a group of regional authoritative name servers designated to serve a network location of the local name server. The system and method for selecting the optimal authoritative name server may have practical applications in a content delivery network system.

18 Claims, 10 Drawing Sheets

U.S. PATENT DOCUMENTS

| | | | |
|---|---|---|---|
| 2002/0010798 A1* | 1/2002 | Ben-Shaul et al. | 709/247 |
| 2002/0038360 A1 | 3/2002 | Andrews et al. | |
| 2002/0078233 A1* | 6/2002 | Biliris et al. | 709/238 |
| 2002/0138649 A1* | 9/2002 | Cartmell et al. | 709/245 |
| 2002/0184575 A1* | 12/2002 | Landan | 714/47 |
| 2003/0074461 A1* | 4/2003 | Kang et al. | 709/230 |
| 2003/0172183 A1* | 9/2003 | Anderson et al. | 709/245 |
| 2006/0112176 A1 | 5/2006 | Liu et al. | |
| 2006/0282505 A1 | 12/2006 | Hasha et al. | |
| 2007/0107059 A1 | 5/2007 | Chasin et al. | |
| 2007/0130316 A1* | 6/2007 | Turakhia | 709/224 |
| 2007/0294419 A1 | 12/2007 | Ulevitch | |
| 2008/0086574 A1* | 4/2008 | Raciborski et al. | 709/245 |

FOREIGN PATENT DOCUMENTS

| | | |
|---|---|---|
| EP | 12335712 A1 | 8/2002 |
| JP | 2007189540 A | 7/2007 |
| WO | WO 98/57275 | 12/1998 |
| WO | WO 99/18534 | 4/1999 |
| WO | WO 01/39470 A1 | 5/2001 |

OTHER PUBLICATIONS

"IP conference routing optimization over Geo satellites", available at <htpp://66.102.1.104/scholar?hl=en&lr=&q=cache:pIN6jygMNrsJ:www.ee.surrey.ac.uk/CCSR/IST/Satlife/docs/papers/icebergs2_ist_summit_2003.pdf> (accessed Dec. 18, 2007) (6 pages).

"Content Delivery Network", available at http://everything2.com/index.pl?node_id=981271 (accessed Dec. 18, 2007) (6 pages).

"Looking for Geo-Directional DNS Service", available at http://www.gossamer-threads.com/lists/nanog/users/102350?page=last (accessed Jan. 22, 2008) (15 pages).

"Transparently Guaranteeing Fault Tolerance, Geographic Affinity, and Load Balanced Mirror Sites", available at http://ausweb.scu.edu.au/aw03/papers/wingenroth/paper.html (accessed Jan. 22, 2008) (8 pages).

Michael J. Freedman, Democratizing Content Distribution, (Sep. 2007) (Ph.D. dissertation, New York University) (224 pages).

Hitesh Ballani et al., A Measurement-based Deployment Proposal for IP Anycast, IMC'06, Oct. 2006 (Oct. 25-27, 2006) (14 pages).

Spring, N. et al, Quantifying the Causes of Path Inflation, in Proc. of ACM SIG-COMM, 2003 (Aug. 25-29, 2003) (12 pages).

*Service Location Protocol: Automatic Discovery of IP Network Services*, Erik Guttman, IEEE Internet Computing, vol. 3, Issue 4, pp. 71-80, Jul.-Aug. 1999 (10 pgs.).

*Geographic Load Balancing for Scalable Distributed Web Systems*, Valeria Cardellini, Michele Colajanni and Philip S. Yu., Proceedings of 8$^{th}$ International Symposium on Modeling, Analysis and Simulation of Computer and Telecommunications Systems, pp. 20-27, Aug. 29, 2000 (9 pgs.).

PCT Notification Concerning Transmittal of International Preliminary Report on Patentability (Chapter I of the Patent Cooperation Treaty) for International Application No. PCT/US2008/084292, mailing date Jul. 1, 2010.

* cited by examiner

SYSTEM AND METHOD FOR SELECTING AN OPTIMAL AUTHORITATIVE NAME SERVER

PRIORITY CLAIM

This invention claims priority to U.S. provisional application Ser. No. 61/016,293 filed Dec. 21, 2007, entitled "System and Method for Selecting an Optimal Name Server," the disclosure of which is incorporated herein in its entirety.

BACKGROUND

1. Technical Field

This invention relates to a domain name resolution system and method and more particularly, to a system and method for selecting an optimal authoritative name server.

2. Related Art

Internet communications involve a client and a server. The client sends a request for a target object and a server responds to the request from the client. The target object includes a domain name service, a web object, etc, For the request of the domain name service, the client requests an internet protocol ("IP") address of a selected domain name. The domain name is a more user-friendly form than a numeric form of the IP address. The domain name is translated into the numeric form of the IP address so that the server is identified and provides its response. Various name servers perform the domain name service, such as a local name server, a root name server, a top level domain ("TLD") name server and an authoritative name server.

Arrangements and operations of the root name server and the TLD name server may be predetermined. Internet hosting administrators may rely on the predetermined arrangements of the root name server and the TLD name servers. Internet hosting administrators may select and register with the TLD name servers a group of authoritative name servers for performing the domain name service. It may be business/operational decisions of the internet hosting administrators to determine where and how many authoritative name servers to be deployed across the internet.

An authoritative name server contains authoritative information with respect to the selected domain name and its corresponding IP address. To perform the domain name resolution, the local name server inquires the authoritative name server about the authoritative information. Accordingly, it is desirable to select an optimal authoritative name server to obtain a faster and reliable domain name reply.

SUMMARY OF THE INVENTION

The present invention is directed to a system and method for selecting an optimal authoritative name server. Multiple global authoritative name servers are arranged at various network locations. Regional authoritative name servers are also present at various network locations. The global authoritative name servers guide a local name server to an optimal authoritative name server. The global authoritative name servers may guide the local name server to one of the regional authoritative name servers based on a location of the local name server. The regional authoritative name servers may provide the local name server with a faster and reliable domain name service reply.

The system and method for selecting the optimal authoritative name server are applicable with a content delivery network. Specifically, one or more regional authoritative name servers are associated with web servers and return IP addresses of the associated web servers. Further, the system and method for selecting the optimal authoritative name server may perform guiding the local name server to a sub-regional authoritative name server arranged proximate to the location of the local name server. The system and method for selecting the optimal authoritative name server may operate in a sub-domain zone. The system and method for selecting the optimal authoritative name server may adopt an anycast address mode or a unicast address mode.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
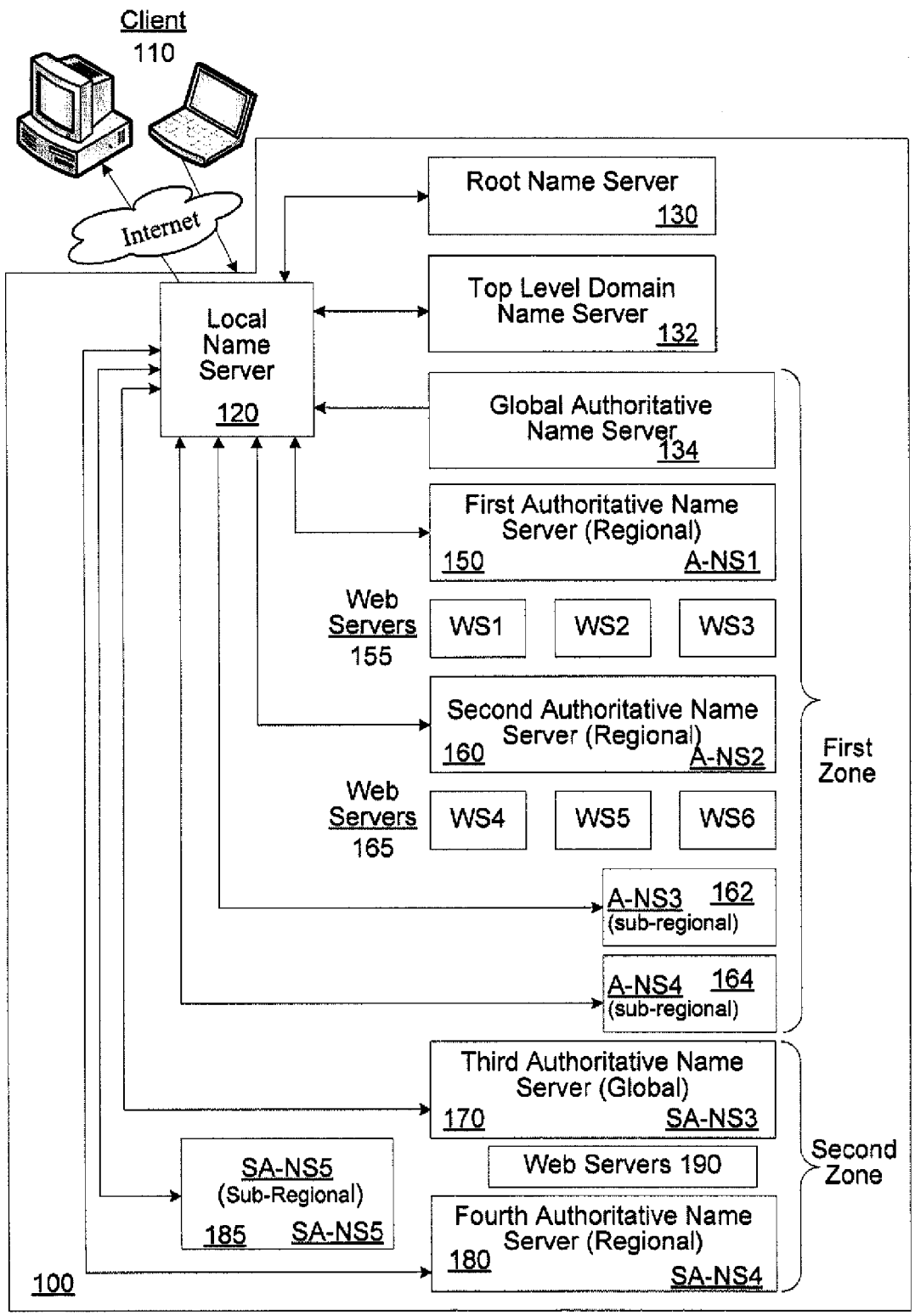
FIG. 1 is a block diagram illustrating a system for selecting an optimal authoritative name server.

FIG. 1 is a block diagram of a system for selecting an optimal authoritative name server 100. The system 100 communicates with a client 110 via an internet. The internet carries various information and services, such as e-mail, file transfer, and the World Wide Web ("WWW"). The client 110 transmits data by packet switching using an internet protocol ("IP") address. The client 110 includes any data processing system with communication ability, such as a desk top computer, a laptop computer, a mobile phone, a vehicle entertainment system, a personal digital assistant, etc.

Users of the client 110 identify a computer or computers on the internet that contains the desired information and service by using a domain name. The domain name is represented as a part of a selected web site's uniform resource locator, e.g., 1. Users of the client 110 are allowed to use alphabetical addresses of the domain name instead of numerical IP addresses, thereby easily communicating with various websites. Multiple IP addresses may be assigned to a single domain name, or a single IP address may be assigned to multiple domain names. Accordingly, a physical server may host multiple web sites having multiple IP addresses, or a single IP address may be assigned to multiple servers by using, e.g., an anycast addressing mode.

The local name server 120 receives a request from the client 110 and initiates a domain name resolution process. Specifically, the local name server 120 operates to find a corresponding IP address of the incoming domain name. For instance, when the client 110 requests the domain name of www.example.com, the local name server 120 operates to find the corresponding IP address of a server which will respond to the client's request. A root name server 130 contains information of a top level domain ("TLD") name server 132 for handling .com of www.example.com. The TLD name server 132 contains information of global authoritative name servers registered to serve www.example.com including a global authoritative name server 134. As a result of these inquiries, the local name server 120 receives information of the global authoritative name servers. The information of the global authoritative name servers may include IP addresses of the authoritative name servers. The TLD name server 132 provides name server records (NS records) of the global authoritative name servers to the local name server 120.

As shown in FIG. 1, the root name server 130, the TLD name server 132, the global authoritative name server 134 and regional authoritative name severs 150, 160, 162, 164, 170, 180 and 185 are in communication with the local name server 120. A first authoritative name server ("the A-NS1") 150 is associated with web servers 155 including but not limited to WS1, WS2 and WS3. A second authoritative name server ("the A-NS 2") 160 is also associated with web servers 165 including but not limited to WS4, WS5 and WS6. The web servers 155 and web servers 165 provide web objects in response to the request of the client 110. The web servers 155 and web servers 165 may operate as cache servers for a content delivery network ("CDN") system.

In FIG. 1, two types of authoritative name servers operate to cover a first zone: the global authoritative name server 134 and the regional authoritative name servers 150, 160, 162 and 164. Structures of the global authoritative name server 134 and the regional authoritative name servers 150, 160, 162 and 164 will be described in detail below in connection with FIGS. 8 and 9. The global authoritative name server 134 is registered with the TLD name server 132 to serve the domain, example.com. In response to the domain name resolution inquiry from the local name server 120, the TLD name server 132 provides the information of the global authoritative name server 134. In FIG. 1, the global authoritative name server 134 is shown, but multiple global authoritative name servers may be registered with the TLD name server 132. The regional authoritative name servers 150, 160, 162 and 164 may not be registered with the TLD name server 132. The regional authoritative name servers 150, 160, 162 and 164 also cover the first zone and serve the domain, example.com. Internet hosting providers may designate the authoritative name servers 150, 160, 162 and 164 as regional authoritative name servers to cover predetermined network locations. Network locations may be determined based on network distance/speed between the client 110 or the local name server 120 and an authoritative name server. Network locations may or may not coincide with geographical locations of the client 110 and the authoritative name server.

As noted above, the first and the second authoritative name servers 150, 160, 162 and 164 cover the first zone of the domain, example.com. In FIG. 1, four regional authoritative name servers are illustrated for convenience of explanations and a large number of authoritative name servers may be used. A third authoritative name server ("SA-NS3") 170 and a fourth authoritative name server ("SA-NS4") 180 cover a second zone. The second zone may cover a sub-domain of the domain covered by the first zone, for example, eu.example.com, us.example.com, etc. The sub-domain is configured to be a downstream level of the selected domain. Although the first zone and the second zone are shown in FIG. 1, more zones are available. FIG. 1 illustrates a second level domain covered in the first zone and a third level domain covered in the second zone, but fourth level or lower domains are available. With regard to the domain resolution request for the sub-domain zone, the local name server 120 inquires, e.g., the global authoritative name server 134 which is registered with the TLD name server 132.

Although not shown in FIG. 1, other authoritative name severs are registered with the TLD name server 132 as global authoritative name servers. The local name server 120 may first inquire the root name server 130 which provides the information of the TLD name server 132. After the local name server's inquiry, the TLD name server 132 provides the information of the global authoritative server 134. The global authoritative name server 134 provides information of a global sub-domain authoritative name server, i.e., SA-NS3 170. The SA-NS3 170 is defined or registered as the global authoritative name server at the global authoritative name server 134.

The authoritative name servers 134, 150, 160, 162, 164, 170 and 180 shown in FIG. 1 include authoritative information of domain names and corresponding IP addresses. As one example, with regard to the domain name, www.example.com, the A-NS1 150 and the A-NS2 160 provide the authoritative IP address to the local name server 120. The global authoritative name server 134 also provides the authoritative IP address to the local name server 120. The IP address stored in the global authoritative name server 134 may be relevant to a network location A, whereas the IP address stored in, e.g., the regional authoritative name server 150 may be relevant to a network location B which is proximate the location of the local name server 120. The A-NS1 150 and the A-NS2 160 also may provide an IP address of the associated web servers 155 and 165 in response to the request for web objects by the client 110 in the CDN service or any other web services. The A-NS1 150 and the A-NS2 160 may have been configured and arranged to serve incoming requests from designated network locations. For instance, the A-NS1 150 may be located in San Francisco to cover requests from a first network location corresponding to west coast areas, and the A-NS2 160 may be located in New York to cover requests from a second network location corresponding to east coast areas. Additionally, both the A-NS1150 and the A-NS2 160 may serve any request from a third network location corresponding to Midwest. The A-NS1 150 and the A-NS2 160 may not be functionally limited to serve the designated network locations. Rather, the A-NS1 150 and the A-NS2 160 are configured to serve the designated network locations for an optimal response, e.g., faster and reliable domain name responses and distribution of a server load. The web servers may also be proximate to the network location of the A-NS1 150 and the A-NS2 160. Thus, if the local name server selects a proximate authoritative name server, network speed between the web servers and the local name server 120 may be fast. Regional distribution of the authoritative name servers such as the A-NS1 150 and the A-NS2 160 may lead to a faster and more reliable domain name resolution system.

The network distribution of the authoritative name server may or may not coincide with physical locations of the authoritative name servers. For managerial convenience, the A-NS1 150 and the A-NS2 160 may be arranged in the same geographical area with different network location coverage. Alternatively, the A-NS1 150 and the A-NS2 160 may be arranged on different continents to be more regionally available to the client 110. For example, if an internet hosting administrator has a principal place of business in the U.S, it may be more convenient to arrange all of the authoritative name servers in the U.S. for maintenance and repair. All of the authoritative name servers may be configured to provide world-wide network services across the internet regardless of their physical locations.

In one embodiment, the A-NS1 150 and the A-NS2 160 are assigned with different domain names and IP addresses. The global authoritative name server 134 returns two different IP addresses for the A-NS1 150 and the A-NS2 160 to the local name server 120 which in turn inquires one of the A-NS1 150 and the A-NS2 160 with the returned IP addresses. In other embodiment, the A-NS1 150 and the A-NS2 160 share a single IP address. For instance, an anycast IP address is assigned to the A-NS1 150 and the A-NS2 160. The global authoritative name server 134 returns the single IP address to the local name server 120 which in turn sends the IP address inquiry with the returned single IP address. Routers (not shown) receive the inquiry and distribute it to one of the A-NS1 150 and the A-NS2 160 based on various factors defined in routing policies. Alternatively or additionally, the global authoritative name server 134 may share a single IP address with other global authoritative name servers.

In one embodiment, the A-NS3 162 and the A-NS4 164 are sub-regional authoritative name servers with respect to the A-NS1 150 and the A-NS2 160. For instance, the A-NS3 162 is physically located in England and the A-NS4 164 is physically located in France. The A-NS3 162 and the A-NS4 164 handle the same level domain as that of the A-NS1 150 and the A-NS2 160, unlike the SA-NS3 170 and the SA-NS4 180 which serve the sub-domain. In FIG. 1, the A-NS1 150, the A-NS2 160, the A-NS3 162 and the A-NS4 164 handle the second level domain. The A-NS1 150 or the A-NS2 160 may guide the local name server 120 to use the A-NS3 162 or the A-NS4 164 based on network proximity between the local name server 120 and the A-NS3 162 or the A-NS4 164.

Figure 2:
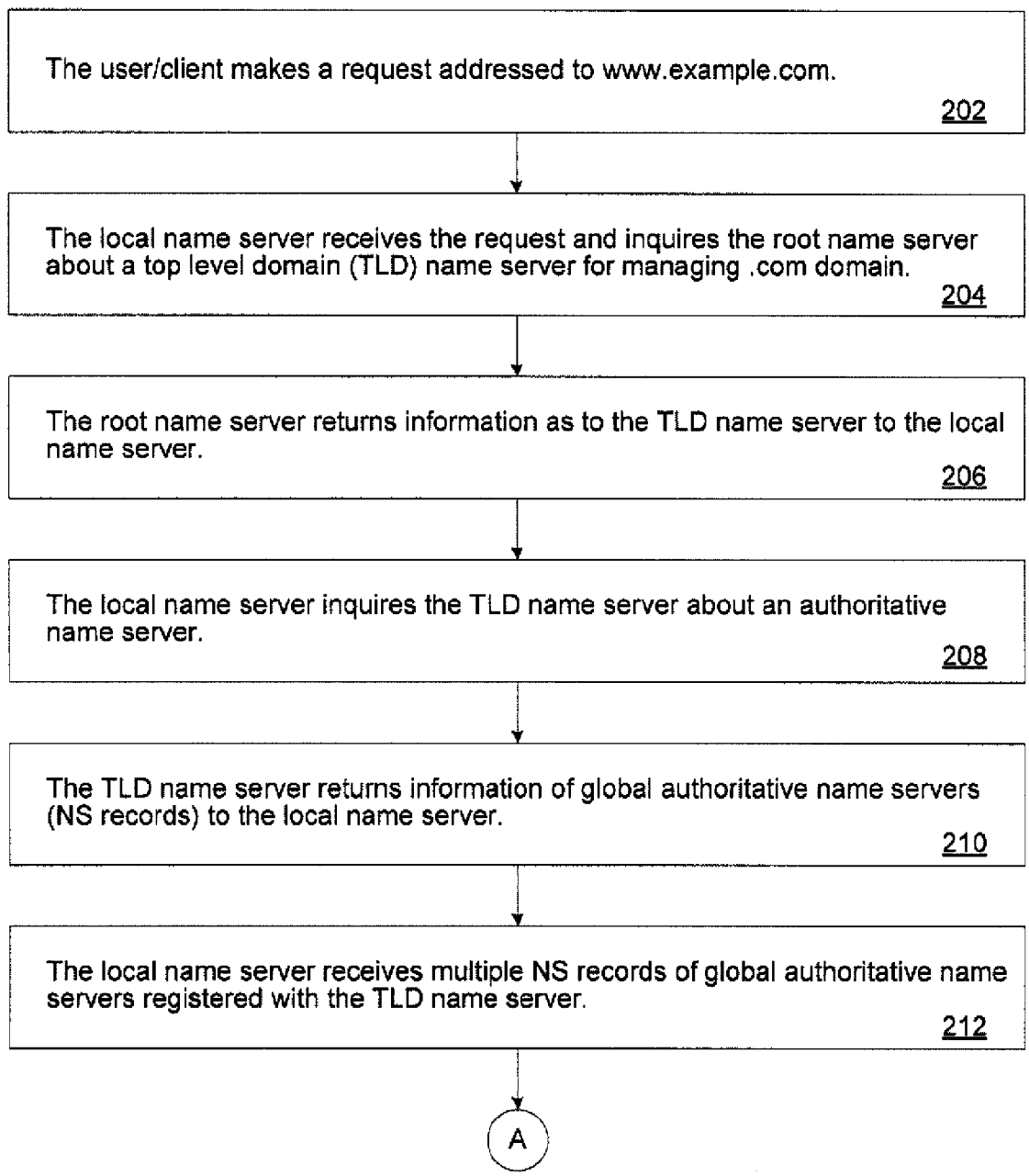
FIGS. 2-4 are flow charts illustrating a first embodiment of a method for selecting an optimal authoritative name server.
Figure 3:
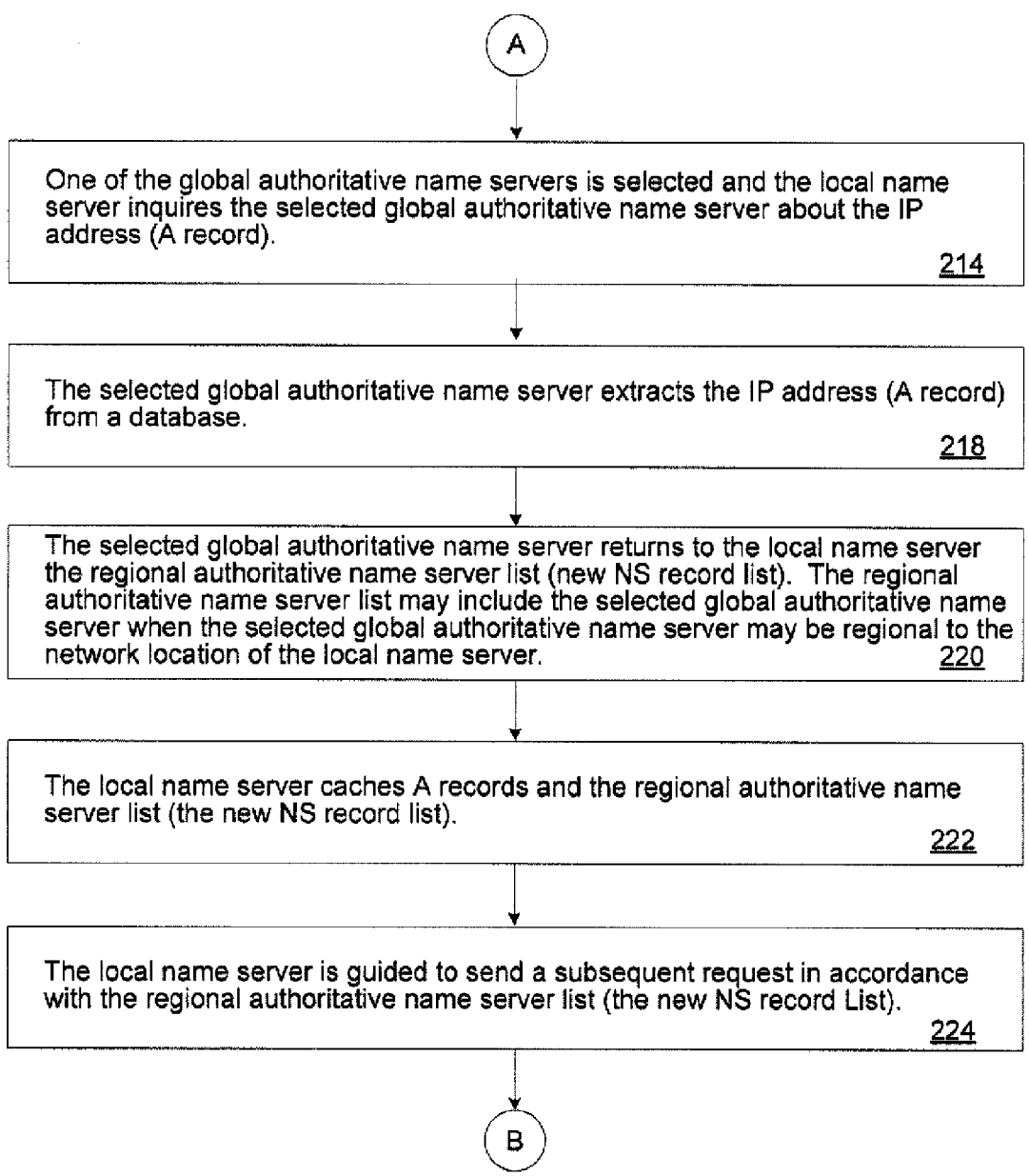
Figure 4:
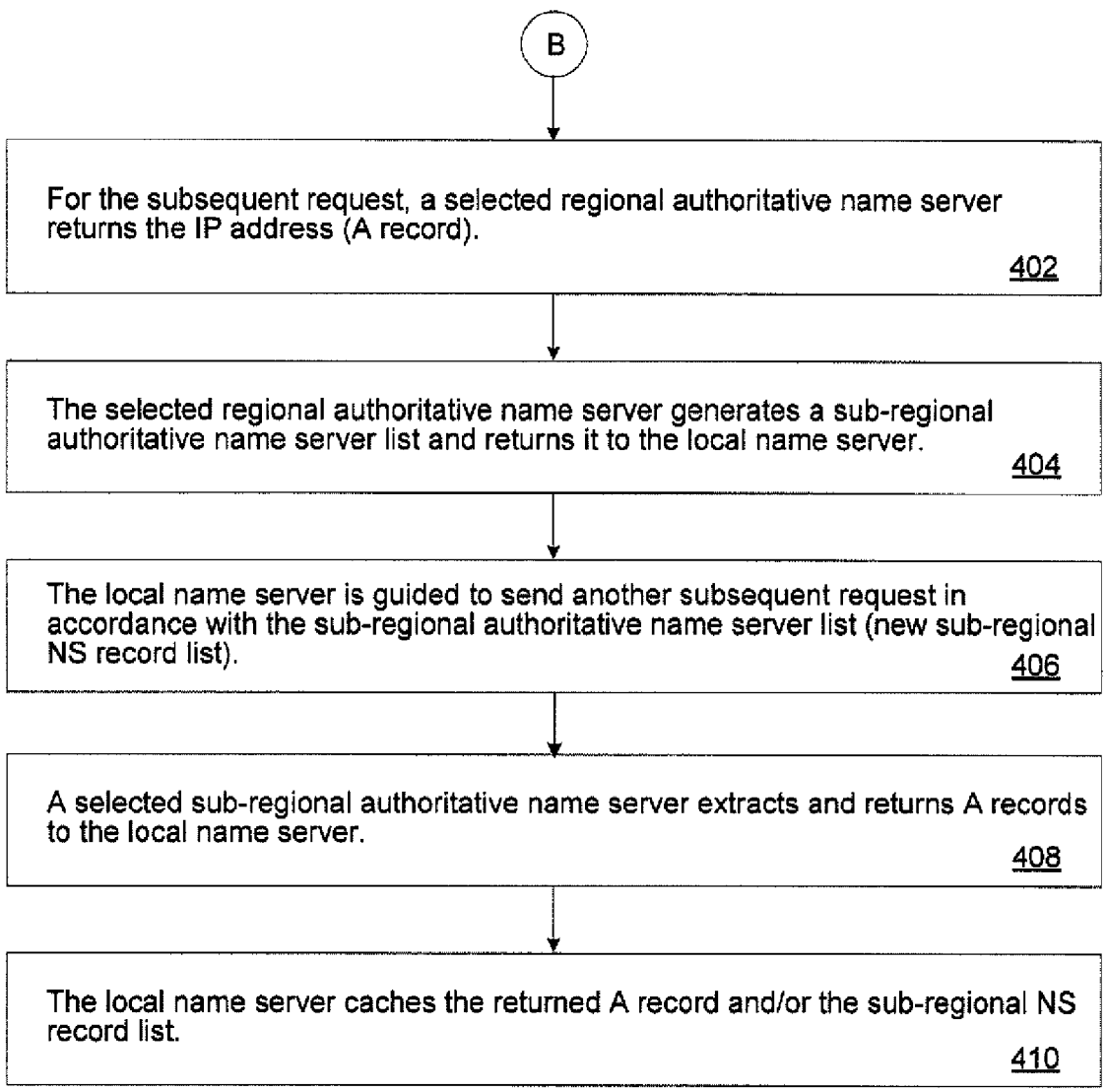

Referring to FIGS. 2-4, operations of the system 100 are described in detail. In FIG. 2, the client 110 sends a request using the domain name, www.example.com at block 202. The local name server 120 receives the request and inquires the root name server 130 about TLD name servers which administer a .com domain at block 204. In this embodiment, the local name server 120 may have no cached information as to the TLD name server 132. Alternatively, the local name sever 120 may not inquire the root name server 130 if the IP addresses of the TLD name servers may be cached. The root name server 130 returns information as to the TLD name server 132 to the local name server 120 at block 206. The local name server 120 subsequently inquires the TLD name server 132 about an authoritative name server at block 208. The TLD name server 132 returns information as to global authoritative name servers including the global authoritative name server 134 to the local name server 120 at block 210. As discussed above, the global authoritative name servers are registered with the TLD name server 132 by an internet hosting administrator of the domain, example.com. The administrator determines configuration and arrangements of the global authoritative name servers, such as a physical location, a number of global authoritative name servers, Address records ("A records") stored therein, time-to-live ("TTL") information, etc. The information from the TLD name server 132 to the local name server 120 includes name server ("NS") records which contain information as to multiple global authoritative name servers. At block 212, the local name server 120 receives the NS records of the multiple global authoritative name servers.

Figure 8:
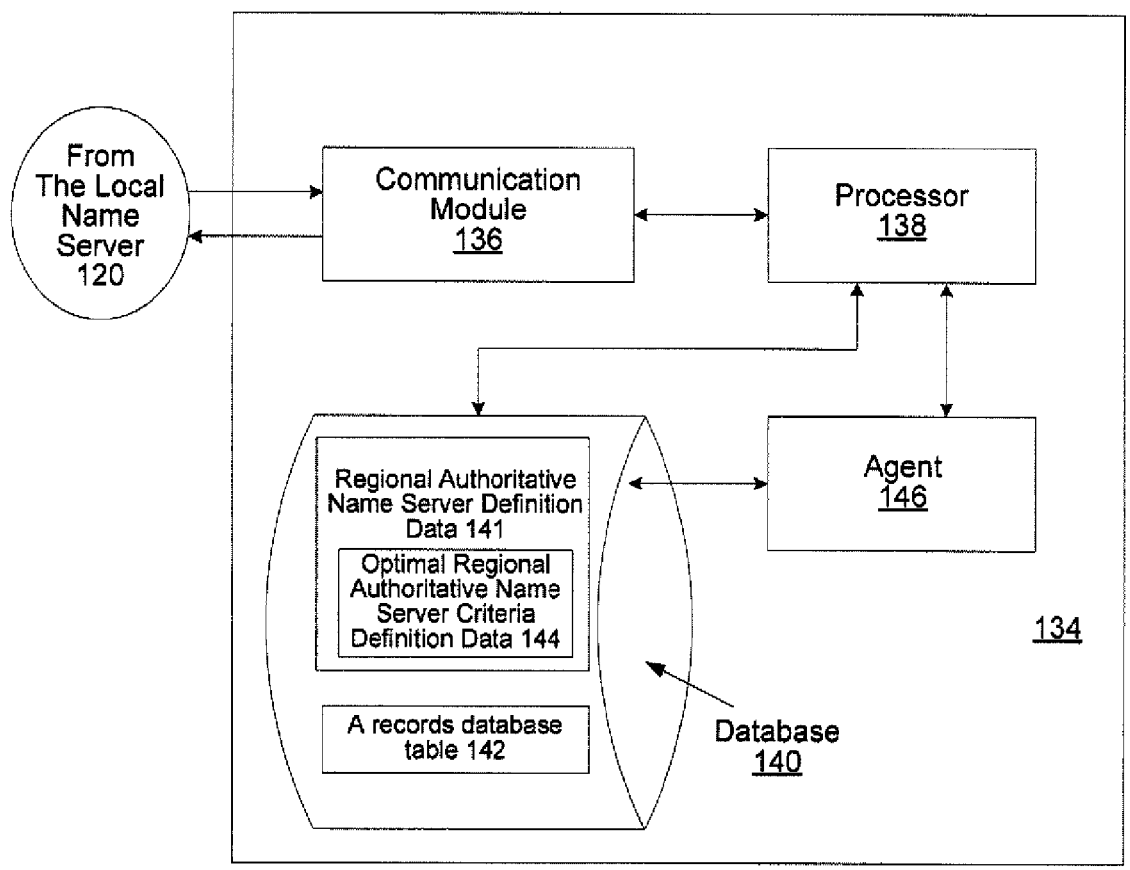
FIG. 8 is a block diagram illustrating structure of the global authoritative name server of FIG. 1.

FIG. 8 illustrates the structure of the global authoritative name server 134 in FIG. 1. The global authoritative name server 134 includes a communication module 136, a processor 138, a database 140 and an agent 146. The communication module 136 receives an input and provides an output. The communication module 136 receives the request from the local name server 120 and provides the domain name resolution result, such as A records to the local name server 120. The processor 138 is in communication with the communication module 136, the agent 146 and the database 140. The processor 138 controls operations of the communication module 136, the database 140 and the agent 146. The agent 146 evaluates and analyzes the domain name resolution request from the local name server 120. For instance, the agent 146 determines the network location of the local name server 120. The agent 146 determines whether the local name server 120 is present, e.g., in Europe or the United States.

The database 140 stores A records database table 142, i.e., IP addresses and domain names of web servers, file transfer protocol servers, etc. such that the global authoritative name server 134 can provide authoritative IP addresses to the local name server 120. The database 140 also stores regional authoritative name server definition data 141 relating to the A-NS1 150 and the A-NS2 160 which serve the first zone of the domain, example.com. More specifically, the database 140 contains the information about which regional authoritative name servers are assigned to manage requests from designated network locations. For instance, the A-NS1 150 and A-NS2 160 are assigned to handle requests from a first network location and requests from a second network location, respectively. For convenience of explanation and by way of example, the first network location coincides with a geographical region, Japan and the second network location coincides with another geographical region, Europe. The network location, however, is neither limited to nor correlates to geographical locations. For example, ping speed or network routing hop counts can be used to determine the network distance, or location. Although the A-NS1 150 and the A-NS2 160 can functionally handle requests from other geographic regions, the internet hosting administrator designates the A-NS1 150 and the A-NS2 160 as "regional" authoritative name servers for Japan and Europe based on many factors including but not limited to convenience of the management and network proximity. By using the geographical example again, the global authoritative name server 134 contains and stores in the regional authoritative name server definition data 141 information that the A-NS1 150 is assigned to provide DNS records to local name servers in Japan and that the A-NS2 160 provides DNS records to local name servers in Europe.

The regional authoritative name server definition data 141 comprises optimal regional authoritative name server criteria definition data 144 ("the optimal regional data 144"). The optimal regional data 144 stores the status information, e.g., network distance from local name servers, whether the regional authoritative name servers are active, overloaded or idle, etc. The status information is periodically updated. While in communication with the regional authoritative name servers, the local name server 120 may further update the status information of the regional authoritative name servers.

The agent 146 retrieves from the database 140 the information as to the regional authoritative name servers based on the location information of the local name server 120, The agent 146 generates an authoritative name server guide which adds new regional authoritative name server list, i.e., a new NS record list. For instance, based on the location of the local name server 120, the authoritative name server guide indicates candidate regional authoritative name servers for handling the requests from the specific network location of the local name server 120 by including the IP addresses. The processor 138 retrieves the corresponding IP address of www.example.com in the A record 142 and provides the authoritative name server guide including the new NS records and the IP address to the local name server 120. An authority section of the domain name resolution reply by the global authoritative name server 134 may be used to pass the authoritative name server guide or the new NS record list to the local name server 120.

Referring to FIG. 3, operations of the selected global authoritative name server 134 are described. The global authoritative name server 134 is selected among the registered global authoritative name servers at block 214. In this embodiment, the global authoritative name server 134 is randomly selected to serve the IP address of the domain name, www.example.com at block 214. In other embodiments, the global authoritative name server 134 is selected because it has better availability. The local name server 120 sends the domain name resolution inquiry to the global authoritative name server 134. The global authoritative name server 134 receives the domain name resolution request and checks about the location of the local name server 120 at block 216. The global authoritative name server 134 determines whether the regional authoritative name servers are designated to cover the network location of the local name server 120 at block 216. Additionally, the global authoritative name server 134 checks whether the regional authoritative name servers are available and currently active. The global authoritative name server 134 extracts the IP address of the example.com zone (A record) from its database at block 218. The global authoritative name server 134 also generates the new NS record list that includes IP addresses of other regional authoritative name servers which are designated to serve the network location of the local name server 120 at block 220. In some instances, that global authoritative name server 134 may operate as a regional authoritative name server for the network location of the local name server 120. The new NS record list may include the IP address of the global authoritative name server 134 at block 220.

The global authoritative name server 134 assumes initial responsibility to respond to the domain name resolution request from the local name server 120. As discussed above, the global authoritative name server 134 is functionally capable of responding to any domain name resolution request of www.example.com from the client 110. The global authoritative name server 134 extracts the IP address of www.example.com from its database at block 218. At block 222, the local name server 120 may cache the new NS record list and the IP address separately. In this embodiment, a caching time of the A record at the local name server 120 is preset to be short when the global authoritative name server 134 provides the A record. The caching time of the A record gradually increases when the regional authoritative name server provides the A record. By adjusting the caching time, the effect of guiding the local name server 120 to regional authoritative name servers may be maximized. Alternatively, or additionally, a large number of clients may benefit from the cached information when the request by one client triggers the generation of the new NS list and caching of the list in the local name server 120.

Figure 9:
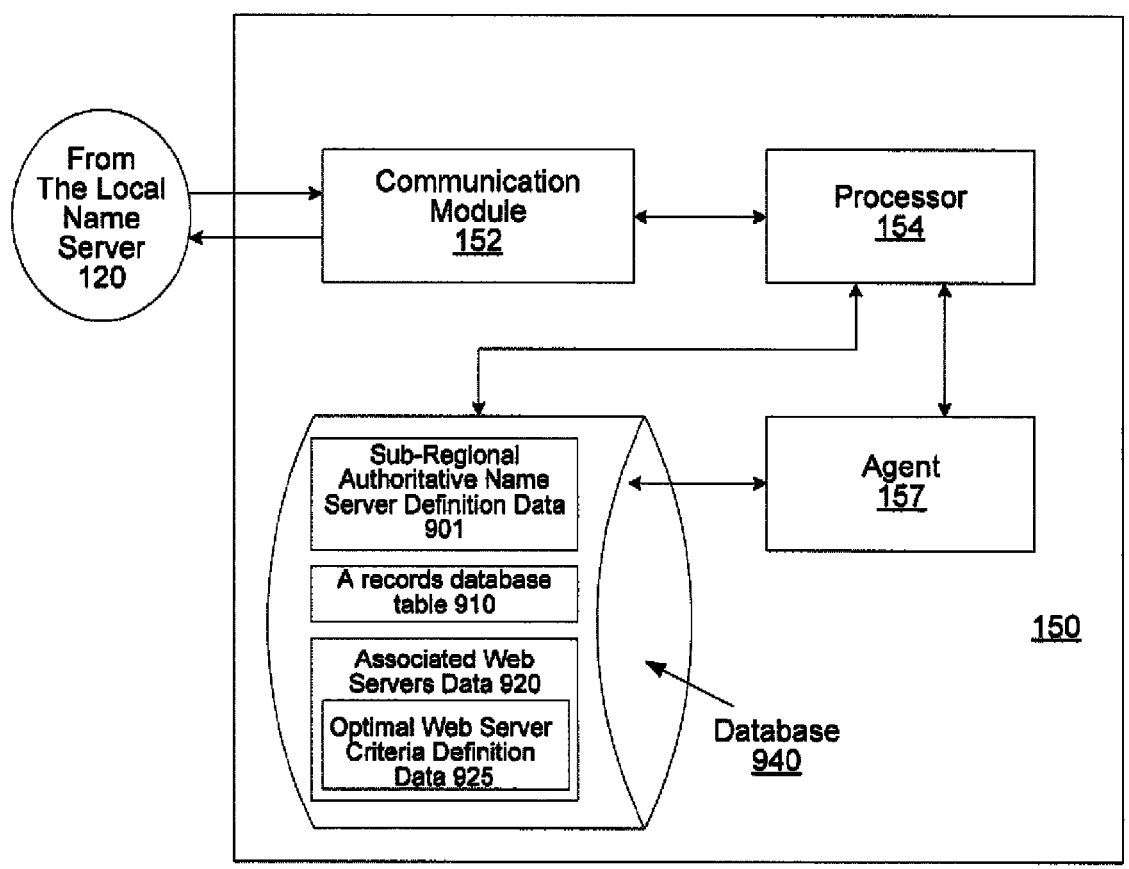
FIG. 9 is a block diagram illustrating structure of the regional authoritative name server of FIG. 1.

The local name server 120 receives subsequent domain name resolution requests with regard to the domain name of example.com. Based on the cached new NS record list, the local name server 120 sends a domain name resolution inquiry to one of regional authoritative name servers which are identified in the new NS record list at block 224. Referring to FIG. 9, the structure of the regional authoritative name server 150 is explained. The regional authoritative name server 150 includes a communication module 152, a processor 154, an agent 157 and a database 940. The communication module 152 communicates with the local name server 120 and the processor 154 and operates to receive an input request and transmit an output reply. The processor 154 controls the operations of the communication module 152 and the agent 157. The processor 154 manages storage and retrieval of data from the database 940.

The database 940 stores sub-regional authoritative name server definition data 901, A records database table 910 and associated web servers data 920. The sub-regional authoritative name server definition data 901 includes information relating to the A-NS3 162 and the A-NS4 164. The processor 154 operates to check the network location of the local name server 120 based on the received domain name resolution request and determine that the A-NS3 162 or the A-NS4 164 is more proximate to the network location of the local name server 120 by retrieving data of the sub-regional authoritative name server definition data 901. The agent 157 retrieves from the database 940 the information as to the A-NS3 162 and the A-NS4 164 based on the location information of the local name server 120. The agent 157 generates a sub-regional authoritative name server guide which adds new sub-regional authoritative name server list, i.e., a new NS record list. For instance, based on the location of the local name server 120, the sub-authoritative name server guide indicates the sub-regional authoritative name servers for handling the requests from the specific network location of the local name server 120 by including the IP addresses. The processor 154 controls the communication module 152 to transmit the sub-regional authoritative name server guide including the new NS records to the local name server 120. An authority section of the domain name resolution reply by the regional authoritative name server 150 may be used to pass the sub-regional authoritative name server guide or the new NS record list to the local name server 120.

The database 940 includes the A records database table 910. The processor 154 retrieves the corresponding IP address of www.example.com in the A record database table 910. The associated web servers data 920 store information as to web servers associated with the regional authoritative name server 150. The associated web servers data 920 includes optimal web server criteria definition data 925 which include information such as server availability, server load, or a combination thereof.

Accordingly, the global authoritative name server 134 operates to guide the local name server 120 to the regional authoritative name servers, and the regional authoritative name servers 150 and 160 operates to guide the local name server 120 to the sub-regional authoritative name servers 162 and 164 based on the location of the local name server 120. Faster and more reliable domain name resolution may be obtained.

Referring to FIG. 4, the operation of the A-NS1 150 is described. According to the authoritative name server guide, the local name server 120 sends a subsequent request to the A-NS1 150. The A-NS1 150 retrieves an IP address corresponding to the subsequent request from the A records database table 910 and returns it to the local name server at block 402. The A-NS1 150 checks the location of the local name server 120 and determines whether the A-NS3 162 or the A-NS4 164 is proximate to the network location of the local name server 120. Upon determination that the A-NS3 162 or the A-NS4 164 is proximate, the agent 157 operates to generate the sub-regional authoritative name server list and returns the list to the local name server 120 at block 404. According to the sub-regional authoritative name server list, the local name server 120 sends another subsequent request to the A-NS3 162 or the A-NS4 164 at block 406. The A-NS3

162 or the A-NS4 164 extracts an IP address corresponding to the subsequent request and returns the IP address to the local name server 120 at block 408. At block 410, the local name server 120 may cache the returned A-record and/or the sub-regional NS record list.

The selection of the optimal authoritative name server described above in conjunction with FIGS. 2-4 may have practical applications as follows. The client 110 inquires the local name server 120 about the domain name of www.example.com. In this example, only for convenience of explanation, four authoritative name servers are present in Europe, Japan, Australia and the United States. The four authoritative name servers are referred to as "global" authoritative name servers because they are registered with the TLD name server 132. Domain names of these four authoritative name servers are nsep.example.com, nsjp.example.com, nuau.example.com and nsus.example.com, respectively. The TLD name server 132 returns to the local name server 120 name server records (NS records) including IP addresses of the four authoritative name servers. The client 110, in this example, resides in England. The local name server 120 is also present in England.

The local name server 120 randomly inquires one of the four authoritative name servers, for instance, nsjp.example.com ("the JP authoritative name server") about the IP address of www.example.com. Alternatively, the JP authoritative name server may be selected because it is the most available or the most stable at the time of the request. The JP authoritative name server receives the domain name resolution request from the local name server 120 and checks the location of the local name server 120. The JP authoritative name server determines that the local name server 120 is present in England. The JP authoritative name server extracts the IP address of www.example.com from its database. The JP authoritative name server also retrieves information as to regional authoritative name servers and determines which regional authoritative name server may be "regional" to handle the domain name resolution service with regard to the network location of the local name server 120. Subsequently, the JP authoritative name server generates a regional authoritative name server list for handling the requests of the local name server 120 for the resolution of the domain, example.com in the first zone. The regional authoritative name server list includes NS records of the regional authoritative name servers including, for example, nseu1.example.com, useu2.example.com, etc. as well as nseu.example.com. The JP authoritative name server may return the regional authoritative name server list by using the authority section of the domain name resolution reply.

The local name server 120 receives the domain name resolution reply and may cache the reply. The NS record information cached in the local name server 120 includes only available, i.e., currently active and/or not overloaded, candidates for the regional authoritative name servers which are provided by the global authoritative name server 134. For subsequent domain name resolution requests of www.example.com, the local name server 120 relies on the cached information and inquires one of the candidates for the regional authoritative name servers. Accordingly, the global authoritative name servers operate to guide the local name server 120 to use the regional available authoritative name servers. Faster and more reliable domain name reply may be obtained.

In another embodiment, the JP authoritative name server may receive a request from a local name server which is present in Japan. The JP authoritative name server may be randomly selected and determines that the request is sent from a network location associated with the JP authoritative name server. The JP authoritative name server also returns to the local name server 120 the regional authoritative name server list. The regional authoritative name server list may include the JP authoritative name server and other regional authoritative name server unregistered with the TDL name server 132. The local name server 120 may cache the regional authoritative name server list. For a subsequent request, the local name server may send a domain name resolution request to the JP authoritative name server or other regional authoritative name server identified in the list.

In another embodiment, only by way of example and for convenience of explanation, the A-NS3 162 and A-NS4 164 are physically present in England and France. The location of the local name server 120 is either England or France, and the A-NS2 160, one of the regional authoritative name server identified in the new NS record list, is located relatively remote from England and France in view of the network distance. In one embodiment, the local name server 120 inquires the global authoritative name server 134 about a first domain name resolution request and is guided to the A-NS2 160 about a second domain name resolution request. In this embodiment the A-NS2 160 is designated as the regional authoritative name server that handles the network location corresponding to Europe. For a second domain name resolution request, the A-NS2 160 may generate a sub-regional authoritative name server list including the A-NS3 162 and/or the A-NS4 164. For instance, the A-NS3 162 will receive and respond to a subsequent domain name resolution inquiry from the local name server 120.

The sub-regional authoritative name server list includes multiple authoritative name servers in case where some of authoritative name servers may be inactive. The global authoritative name servers and the regional authoritative name server cover the single zone and may have identical functionality. Guidance from the global authoritative name servers to the regional authoritative name servers may facilitate more structured and reliable domain name service based on the location of the local name server 120. Accordingly, improved performance with high reliability may be obtained in the domain name service.

The selection of the optimal authoritative name server also may be for use with a content delivery network ("CDN") system. The CDN system operates to provide requested content from cache servers instead of an origin server. The cache servers include web servers distributed across the network. Preferably, a web server closest to a location of a client or a user responds to the request from the client. The CDN system distributes load of the origin server to the cache servers and thus, provides faster response to the client. As shown in FIG. 1, the A-NS1 150 and the A-NS2 160 are respectively tied with the web servers WS1-WS 6. As the A-NS1 150 and the A-NS2 160 may be likely close to the client 110 in terms of network distance and network speed, the web servers 155 and 165 are also close to the client's location 110. The web servers 155 and 165 operate as cache servers of the CDN system.

Figure 5:
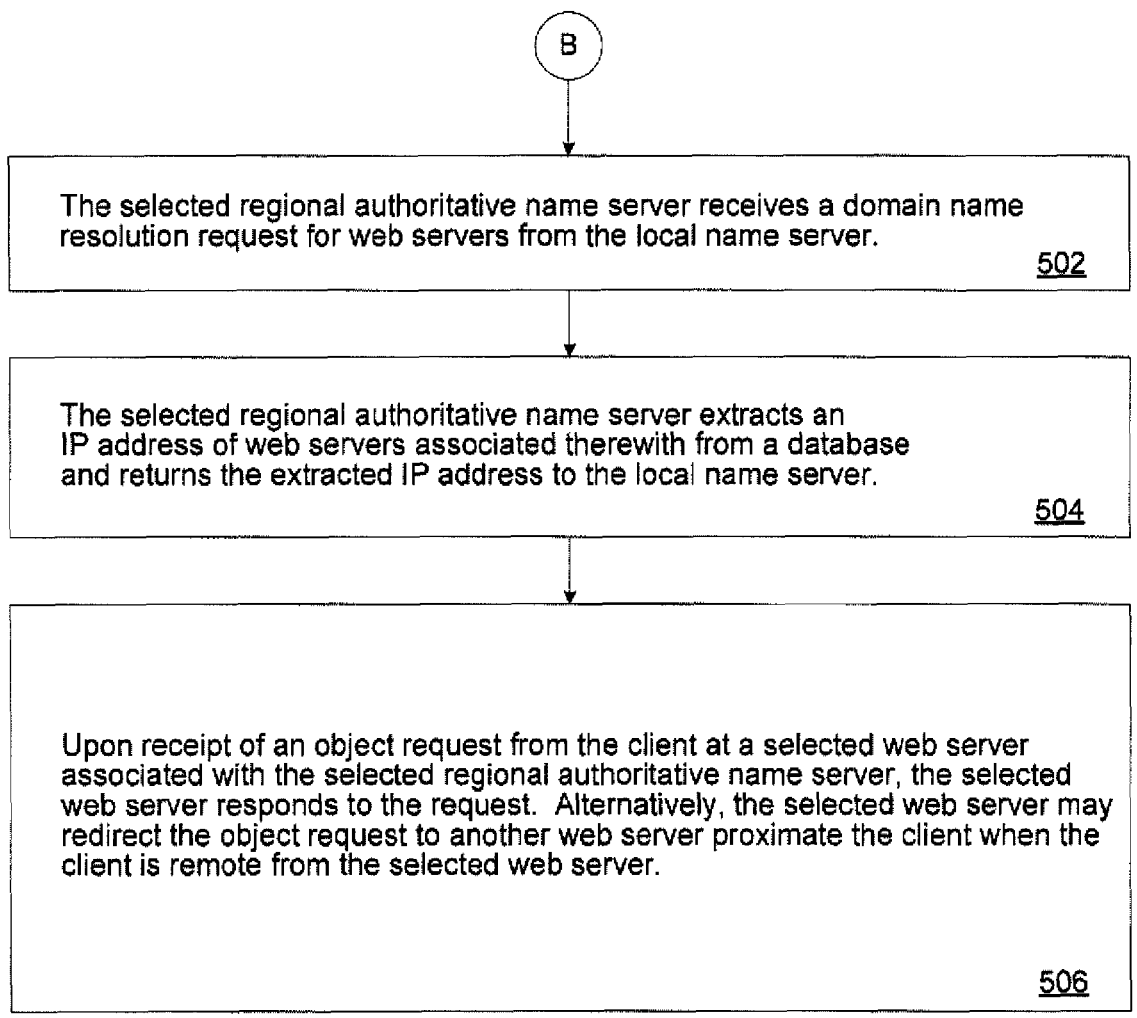
FIG. 5 is a flow chart illustrating a content delivery network system for use with the method for selecting the optimal authoritative name server of FIGS. 2-4.

Referring to FIG. 5, operations of the CDN system using the selection of the optimal authoritative name server are described. As shown in FIG. 1, the web servers 155 and 165 are tied with the A-NS1 150 and the A-NS2 160. The local name server 120 is guided to send a subsequent request to the A-NS1 150 or the A-NS2 160, as discussed above in connection with FIGS. 2-4 and FIG. 9. For a subsequent request, the selected regional authoritative name server receives a request for web servers from the local name server at block 502. Upon receipt of the domain name resolution request from the local name server 120, the A-NS1 150 or the A-NS2 160 extracts an IP address of web servers associated therewith from the database (e.g., the A records database table 910 in FIG. 9) and returns the extracted IP address to the local name server 120 at block 504. The local name server sends the IP address of a selected web server to the client 110 which in turn sends a request for a target object to the web server. Upon receipt of the target object request from the client 110, the selected web server responds to the request by providing the requested object at block 506. Alternatively, the selected web server may determine the network location of the client 110. The client 110 may be remote from the selected web server, for example, when the client 110 uses a remote local name server. The selected web server is associated with the regional authoritative name server which is proximate to the local name server. The selected web server may redirect the target object request from the client 110 to another web server proximate to the client 110 at block 506.

In the CDN system, a first request received from the local name server 120 triggers generation of the regional authoritative name server list and with regard to a second request, the regional authoritative name server identified in the regional authoritative name server list communicates with the local name server 120. With regard to the second or subsequent requests, the regional authoritative name server provides the local names server 120 with IP addresses of the web servers.

Figure 6:
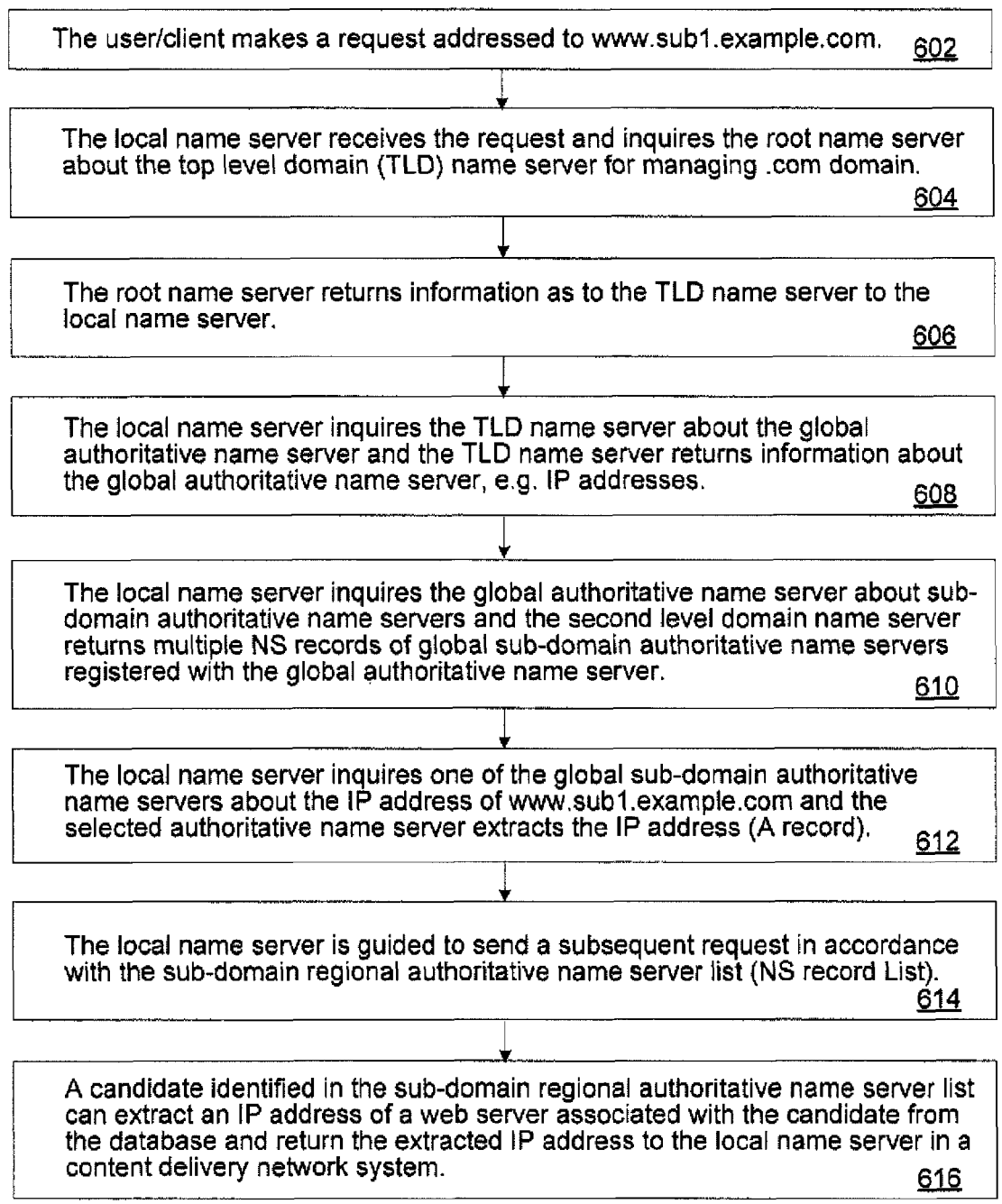
FIG. 6 is a flow chart illustrating a second embodiment of a method for selecting an optimal authoritative name server.

FIG. 6 is a flow chart illustrating a second embodiment of a method for selecting an optimal authoritative name server. In FIG. 1, the third authoritative name server ("the SA-NS3") 170 and the fourth Authoritative name server ("the SA-NS4") 180 are arranged to serve a sub-domain of the domain, example.com. The SA-NS3 170 and the SA-NS4 180 also cover a second zone of the sub-domain. In this embodiment, the sub-domain corresponds to a third level domain, whereas the domain, example.com corresponds to a second level domain. In other embodiments, subsequent sub-domains may be added, such as a fourth level domain, a fifth level domain, etc., such as sub2.sub1.example.com, sub3.sub2.sub1.example.com, etc.

Referring to FIG. 6, operations of the second embodiment are described in detail. The client 110 makes a domain name request with regard to www.sub1.example.com of the sub-domain, sub1.example.com at block 602. The local name server 120 receives the request and inquires the root name server 130 about the .com TLD name server 132 at block 604. The root name server 130 returns the IP address of the TLD name server 132 at block 606 and the local name server 120 inquires the TLD name server 132 about information of the global authoritative name server 134 for managing the domain, example.com at block 608. The TLD name server 132 returns the IP addresses of the global authoritative name server 134 to the local name server 120 at block 608. The local name server 120 inquires the global authoritative name server 134 about sub-domain authoritative name servers and the global authoritative name server 134 returns multiple NS records as to "global" sub-domain authoritative name servers at block 610. The global sub-domain authoritative name servers are registered with the global authoritative name server 134. Referring to FIG. 1, the global sub-domain authoritative name servers include the SA-NS3 170.

The local name server 120 inquires one of the global sub-domain authoritative name servers, e.g., the SA-NS3 170, about the IP address of the sub-domain, www.sub1.example.com at block 612. The inquiry by the local name server 120 into the SA-NS3 170 may be random or based on a status of the SA-NS3 170, e.g., active and/or overloaded. The SA-NS3 170 extracts the IP address from the database at block 612. The SA-NS3 170 assumes initial responsibility of providing A records of the sub-domain name, www.sub1.example.com. The SA-NS3 170 also retrieves from its database information as to sub-domain regional authoritative name servers and generates the sub-domain regional authoritative name server list at block 614. The structure of the SA-NS3 170 is similar to that of the global authoritative name server 134 as shown in FIG. 8. Instead of the regional authoritative name server definition data 141, the SA-NS3 170 stores in the database sub-domain regional authoritative name server definition data. Based on the data of the sub-domain regional authoritative name server definition data, the SA-NS3 170 generates and provides the sub-domain regional authoritative name server list. The sub-domain regional authoritative name server list includes a new NS record list of sub-domain regional authoritative name servers such as the SA-NS4 180 based on location of the local name server 120. Although not shown, numerous sub-domain regional authoritative name servers are available. The structure of the sub-domain regional authoritative name servers may be similar to that of the regional authoritative name server as shown in FIG. 9.

At block 614, the local name server 120 is guided to send a subsequent request based on the sub-domain regional authoritative name server list. The SA-NS3 170 may check whether a candidate identified in the sub-domain regional authoritative name server list may be active and/or overloaded. The SA-NS4 180 receives a subsequent domain name resolution inquiry from the local name server 120. Operations of the local name server 120 and the global/regional authoritative name servers described above in conjunction with the first embodiment are applicable to this embodiment. Faster and more reliable information for the sub-domain name resolution request may be obtained.

The second embodiment also may be for use with the CDN system. As discussed above in conjunction with FIGS. 1 and 5, one of the sub-domain regional authoritative name servers receives and processes a second domain name inquiry from the local name server 120. The sub-domain regional authoritative name servers may be associated with several web servers including web servers 190 as shown in FIG. 1. For a subsequent request, one of the sub-domain authoritative name servers extracts and returns IP addresses of the associated web servers at block 616. In the second embodiment, a sub-domain sub-regional authoritative name server, SA-NS5 182 is network-proximate to the local name server 120. The SA-NS4 180 may guide the local name server 120 to the SA-NS5 185 for a subsequent request such that the SA-NS5 185 responds to the request. Although the SA-NS5 182 is shown, numerous sub-regional authoritative name servers are available in the second zone.

Figure 7:
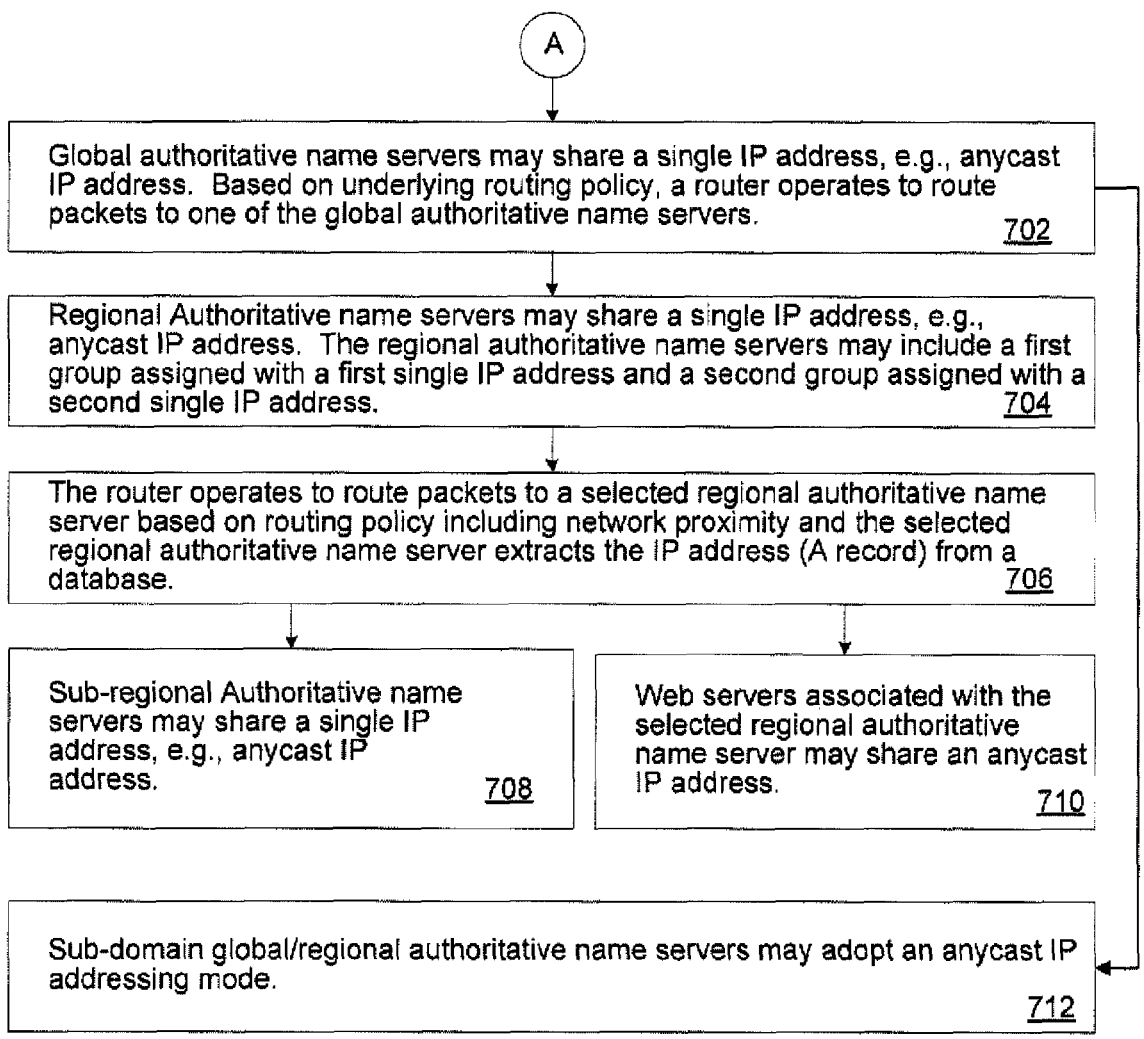
FIG. 7 is a flow chart illustrating a third embodiment of the method for selecting the optimal authoritative name server.

FIG. 7 is a flow chart illustrating a third embodiment of a method for selecting an optimal authoritative name server. In the first embodiment discussed above in conjunction with FIGS. 2-4, the first and the second authoritative name servers 150, 160, 162 and 164 are assigned with different domain names and IP addresses. At block 702, the local name server 120 receives the single IP address of the multiple global authoritative name servers including the global authoritative name server 134 from the TLD name server 132 as shown in FIG. 1. Packets from the client 110 destined to the single IP address are automatically routed to the global authoritative name server 134. Alternatively, or additionally, the first and the second authoritative name servers 150, 160, 162 and 164 share a single IP address at block 704. Specifically, the third embodiment adopts an anycast addressing mode where the same IP address is assigned to multiple servers. The global authoritative name server 134 may provide a single shared IP address for the regional authoritative name servers, the first and the second authoritative name servers 150, 160, 162 and 164. Preferably, the packets from the client 110 are routed to one of the regional authoritative name servers 150, 160, 162 and 164 which is the closest to the client 110 in the network distance at block 704. Alternatively, routing decisions may differ based on underlying routing policies at block 706.

The selected regional authoritative name server extracts the IP address of the domain name, www.example.com and returns the IP address (A record) to the local name server at block 706. In the CDN system, the selected regional authoritative name server returns the IP addresses of web servers proximate the selected authoritative name server to the local name server at block 706. As shown at blocks 708, 710 and 712, sub-regional authoritative name servers, web servers associated with the selected regional authoritative name server, and/or sub-domain global/regional authoritative name servers may adopt an anycast IP addressing mode.

Figure 10:
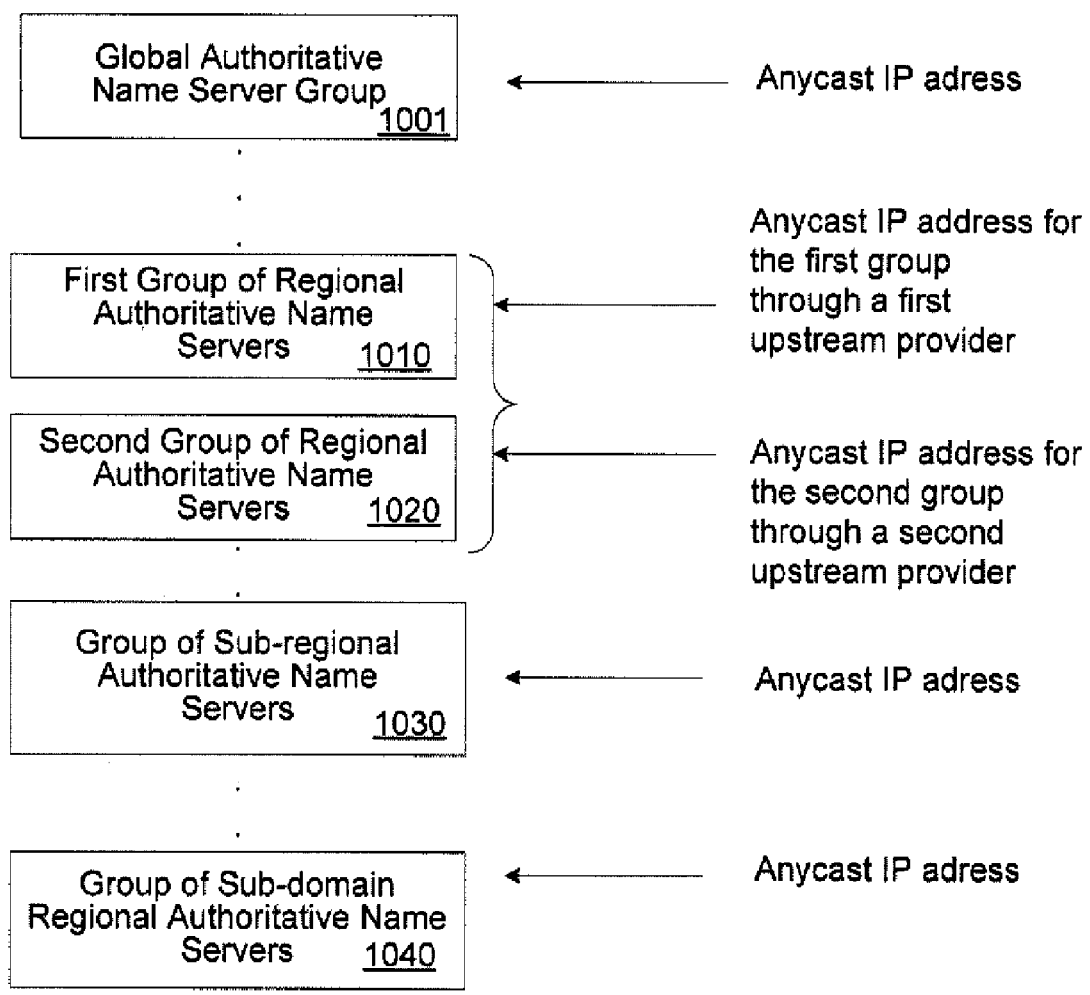
FIG. 10 illustrates an anycast IP address mode for use with the system and method for selecting the optimal authoritative name server.

The regional authoritative name servers may be divided into multiple groups. The multiple groups may share different anycast IP addresses. Assignment of anycast IP addresses may depend on coverage of an upstream provider, performance and functionality of servers, etc. For instance, a selected group of the regional authoritative name servers may include the regional authoritative name servers which use an autonomous system of a particular upstream provider as a backbone provider. The selected group may be assigned with a single anycast IP address. In FIG. 10, the regional authoritative name servers may include a first group 1010 and a second group 1020. The first group 1010 shares a first single IP address and the second group 1020 shares a second single IP address. The first group uses an autonomous system of a first upstream provider, and the second group uses the autonomous system of a second upstream provider. The first single IP address may be advertised only through the autonomous system of the first upstream provider.

In one embodiment, a global authoritative name server group 901 may use an anycast IP address. Alternatively, or additionally, a group of sub-regional authoritative name servers 1001, 1030 and/or a group of sub-domain regional authoritative name servers 1040 may share an anycast IP address.

The embodiments described above perform guidance to the regional authoritative name servers by the global authoritative name servers. The regional authoritative name servers may be, at least based on the network location and network proximity, optimally situated to generate the domain name resolution reply for the local name server. Further, the regional authoritative name servers may provide guidance to sub-regional authoritative name servers. Alternatively, the guidance to the optimal authoritative name server is available with the sub-domain authoritative name servers. Guiding the local name server to inquire the optimal authoritative name servers may provide improved, faster and reliable domain name service. The embodiments described above are applicable to the CDN service. Web servers are associated with the regional, the sub-regional, or the sub-domain authoritative name servers. The guidance to the regional, the sub-regional, or the sub-domain authoritative name servers will lead to guidance to the associated web servers.

The global authoritative name servers include the database which contains information to generate the new NS records for the regional, the sub-regional, or the sub-domain authoritative name servers. The authority section of the domain name service reply by the global authoritative name servers may be used to convey the new NS records to the local name server. A majority of subsequent requests are guided to request their domain name service to the optimal authoritative name servers in a short time frame. Also, a majority of subsequent requests are guided to request their web objects to the optimal web servers in a short time frame. Improved CDN services may be obtained.

The embodiment described above may adopt the unicast addressing mode or the anycast addressing mode. With regard to the anycast addressing mode, the same IP address may be used for the global or regional authoritative name servers, thereby providing reliability, improved performance and reduced management of the IP address. By using the multiple IP addresses and multiple upstream providers, world-wide services may be obtained.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for selecting an optimal authoritative name server, comprising:

receiving a resolution request for a selected domain name of a predetermined zone from a local name server initially at a global authoritative name server publicly registered to respond to the resolution request for the selected domain name of the predetermined zone;

evaluating the resolution request to determine at least a network location of the local name server;

generating at the global authoritative name server an authoritative name server guide at least based on the network location of the local name server, the authoritative name server guide identifying a candidate regional authoritative name server which is internally designated to serve the network location of the local name server and the predetermined zone, wherein the authoritative name server guide refers the local name server to the candidate regional authoritative name server as an authoritative name server for the resolution request for the selected domain name of the predetermined zone; and returning at the global authoritative name server both an internet protocol (IP) address (A record) of the selected domain name and the authoritative name server guide to the local name server and guiding the local name server to communicate with the candidate regional authoritative name server for a subsequent resolution request for the selected domain name of the predetermined zone;

arranging multiple global authoritative name servers registered with a top-level domain name server to manage the predetermined zone; and arranging regional authoritative name servers recognized in each of the multiple global authoritative name servers for managing designated network locations in the predetermined zone;

associating a web server with one or more of the regional authoritative name servers wherein the web server responds to a request for a web object; and returning information of the associated web server to the local name server.

2. The method of claim 1, further comprising:

arranging a plurality of global authoritative name servers at distributed network locations where each of the plurality of global authoritative name servers is assigned with a different IP address and a different domain name.

3. The method of claim 1, further comprising: collecting and evaluating information of the regional authoritative name servers at each of the multiple global authoritative name servers wherein the information comprises a server load, an active status, physical locations, network locations, or a combination thereof.

4. The method of claim 1, further comprising:
arranging sub-regional authoritative name servers that are network-proximate to the network location of the local name server;
generating at one or more of the regional authoritative name servers a sub-regional authoritative name server list identifying a candidate sub-regional authoritative name server designated to serve the network location of the local name server; and
providing the sub-regional authoritative name server list to the local name server.

5. The method of claim 4, further comprising:
associating a web server with one or more of the sub-regional authoritative name servers wherein the web server responds to a request for a web object; and
returning an IP address of the associated web server to the local name server.

6. The method of claim 1, further comprising:
arranging a plurality of global authoritative name servers at distributed locations where each of the plurality of global authoritative name servers is assigned with a single IP address.

7. A method for selecting an optimal authoritative name server, comprising:
receiving a first request of a domain name resolution request of a predetermined zone at one of global authoritative name servers publicly registered to respond to the domain name resolution request of the predetermined zone;
evaluating the domain name resolution request and locating regional authoritative name servers designated to respond to the domain name resolution request of the predetermined zone, wherein the regional authoritative name servers are registered with at least the one of global authoritative name servers;
generating an authoritative name server guide that identifies a selected group of the regional authoritative name servers, the authoritative name server guide referring to the regional authoritative name server as an authoritative name server for the domain name resolution request of the predetermined zone;
returning to a local name server both an IP address (A record) resolving the first request of the domain name resolution request and the authoritative name server guide; and
receiving a subsequent request of the domain name resolution request of the predetermined zone at one of the selected group of the regional authoritative name servers in accordance with the authoritative name server guide;
arranging multiple global authoritative name servers registered with a top-level domain name server to manage the predetermined zone; and
arranging regional authoritative name servers recognized in each of the multiple global authoritative name servers for managing designated network locations in the predetermined zone;
associating a web server with one or more of the regional authoritative name servers wherein the web server responds to a request for a web object; and
returning information of the associated web server to the local name server.

8. The method of claim 7, further comprising:
associating a plurality of web servers with one or more of the selected group of the regional authoritative name servers wherein the plurality of web servers responds to a web object request; and
returning IP addresses of the associated web servers to the local name server.

9. The method of claim 8, further comprising:
receiving a sub-domain name resolution request relevant to a sub-domain at one of the global authoritative name servers where the sub-domain comprises third-level or lower domains;
returning to the local name server IP addresses of a global sub-domain authoritative name server;
generating at the global sub-domain authoritative name server a sub-domain regional authoritative name server list identifying a candidate sub-domain regional authoritative name server designated to serve the network location of the local name server; and
providing the sub-domain regional authoritative name server list to the local name server.

10. An optimal authoritative server selection system, comprising:
a plurality of global authoritative name servers publicly known to serve a predetermined domain zone and communicating with a local name server; and
a plurality of regional authoritative name servers registered with the plurality of global authoritative name servers to serve multiple designated network locations of the predetermined domain zone, the plurality of regional authoritative name servers grouped into a first group and a second group;
wherein a global authoritative name server comprises:
an agent operable to generate and configure a regional authoritative name server list which identifies the first group and the second group of the regional authoritative name servers and refers the local name server to the regional authoritative name servers as an authoritative name server;
a database configured to store:
regional authoritative name server definition data including information of the first group and the second group; and
an A records database table that contains domain names and corresponding IP addresses;
wherein a selected global authoritative name server initially receives a first request of a domain name resolution request from the local name server and provides both an IP address (A record) from the A records database table resolving the first request of the domain name resolution request and the regional authoritative name server list to the local name server,
wherein one of the regional authoritative name servers identified in the regional authoritative name server list receives a subsequent request of the domain name resolution request from the local name server; and
wherein each of the plurality of global authoritative name servers is assigned with a different IP address and a different domain name.

11. The system of claim 10, wherein the selected global authoritative name server extracts a first IP address responsive to the first request of the domain name resolution request from the A records database table, and the agent retrieves the regional authoritative name server definition data from the database and generates the regional authoritative name server list.

12. The system of claim 10, wherein a selected regional authoritative name server comprises:
   an regional agent operable to generate and configure a sub-regional authoritative name server list which identifies a group of sub-regional authoritative name servers; and
   a regional database configured to store:
      sub-regional authoritative name server definition data including information of a first group of sub-regional authoritative name servers and a second group of the sub-regional authoritative name servers; and
      regional A records database table that contain the domain names and the corresponding IP addresses.

13. The system of claim 12, wherein the regional database further comprises:
   associated web servers data including information of a web server associated with the selected regional authoritative name server.

14. The system of claim 10, wherein the predetermined domain zone covers a second level domain, or a sub-domain of the second level domain.

15. The system of claim 10, wherein the plurality of regional authoritative name server shares a single IP address which comprises an anycast IP address.

16. The system of claim 10, wherein the first group of the regional authoritative name servers shares a first single IP address and the second group of the regional authoritative name servers shares a second single IP address, wherein the first group uses a first autonomous system of a first upstream provider and the second group uses a second autonomous system of a second upstream provider.

17. The system of claim 10, wherein the regional authoritative name server definition data comprises optimal regional authoritative name server selection criteria definition data including network speed information to the regional authoritative name servers from the local name server, geographical distance information, a routing hop count, availability, network usage cost, or a combination thereof.

18. The system of claim 10, wherein a reply to the first request of the domain name resolution request comprises an authority section that contains the regional authoritative name server list.

* * * * *